(12) United States Patent
Adis et al.

(10) Patent No.: US 7,565,729 B2
(45) Date of Patent: Jul. 28, 2009

(54) METHODS OF MANUFACTURING A SEGMENTED BRUSH SEAL FOR SEALING BETWEEN STATIONARY AND ROTARY COMPONENTS

(75) Inventors: William E. Adis, Scotia, NY (US); David Gerard DuHaime, Ivyland, PA (US); Michael Mack, Levittown, PA (US)

(73) Assignee: General Electric Company, Schenectady, NY (US)

( * ) Notice: Subject to any disclaimer, the term of this patent is extended or adjusted under 35 U.S.C. 154(b) by 592 days.

(21) Appl. No.: 11/377,200

(22) Filed: Mar. 17, 2006

(65) Prior Publication Data

US 2007/0214628 A1  Sep. 20, 2007

(51) Int. Cl.
*B23P 11/00* (2006.01)
*B21D 53/84* (2006.01)
*F01D 11/02* (2006.01)

(52) U.S. Cl. .......................... 29/505; 29/888.3; 29/469; 29/557; 277/355

(58) Field of Classification Search .................. 29/505, 29/888.3, 464, 469, 557; 277/355; 300/21; 228/160, 173.5
See application file for complete search history.

(56) References Cited

U.S. PATENT DOCUMENTS

| | | | | |
|---|---|---|---|---|
| 2,449,668 A | * | 9/1948 | Peterson | 300/21 |
| 3,917,150 A | * | 11/1975 | Ferguson et al. | 228/159 |
| RE30,206 E | * | 2/1980 | Ferguson et al. | 415/173.7 |
| 4,204,629 A | * | 5/1980 | Bridges | 228/160 |
| 4,274,575 A | * | 6/1981 | Flower | 228/160 |
| 4,642,867 A | * | 2/1987 | Hough et al. | 29/423 |
| 4,678,113 A | * | 7/1987 | Bridges et al. | 228/160 |
| 4,730,876 A | * | 3/1988 | Werner et al. | 300/2 |
| 4,884,850 A | * | 12/1989 | Greer | 300/21 |
| 4,934,759 A | * | 6/1990 | Bridges | 300/11 |
| 5,083,840 A | * | 1/1992 | Young et al. | 300/21 |
| 5,108,155 A | * | 4/1992 | Hettes et al. | 300/21 |
| 5,165,758 A | * | 11/1992 | Howe | 300/21 |
| 5,183,197 A | * | 2/1993 | Howe | 228/160 |
| 5,318,309 A | | 6/1994 | Tseng et al. | |
| 5,403,071 A | * | 4/1995 | Hostetler et al. | 300/21 |
| 5,400,952 A | | 12/1995 | Bagepalli et al. | |
| 5,474,306 A | | 12/1995 | Bagepalli et al. | |
| 5,678,898 A | * | 10/1997 | Bagepalli et al. | 300/21 |
| 5,732,466 A | * | 3/1998 | Bouchard | 29/888.3 |

(Continued)

OTHER PUBLICATIONS

Adis et al., "Pressure Balanced Brush Seal," U.S. Appl. No. 11/237,976, filed Sep. 29, 2005, pending.

*Primary Examiner*—Essama Omgba
(74) *Attorney, Agent, or Firm*—Nixon & Vanderhye, P.C.

(57) ABSTRACT

A method of forming brush seal segments includes mounting a pair of full form plates having opposite arcuate edges in back-to-back relation and wrapping wire about the form plates in multiple passes to form wire runs at angles, e.g., 35-45° relative to radii of the arcuate edges. Half form plates are assembled to opposite sides of the full form plates adjacent one edge of the subassembly. The wire wrap adjacent the one edge of the full form plates is removed. Welds are applied between each adjacent half and full form plates. The inner edges of the wrapped wire and inner frame members of the full form plates are removed. The assembly is then separated to form a pair of arcuate brush seal segments.

14 Claims, 18 Drawing Sheets

U.S. PATENT DOCUMENTS

| | | | |
|---|---|---|---|
| 5,799,952 A | 9/1998 | Morrison et al. | |
| 5,961,279 A | 10/1999 | Ingistov | |
| 6,010,132 A | 1/2000 | Bagepalli et al. | |
| 6,027,121 A | 2/2000 | Cromer et al. | |
| 6,042,119 A | 3/2000 | Bagepalli et al. | |
| 6,062,463 A * | 5/2000 | Hoffmueller et al. | 228/212 |
| 6,109,616 A * | 8/2000 | Mayr | 277/355 |
| 6,120,622 A * | 9/2000 | Mayr et al. | 148/516 |
| 6,139,019 A | 10/2000 | Dinc et al. | |
| 6,173,958 B1 | 1/2001 | Dinc et al. | |
| 6,226,975 B1 | 5/2001 | Ingistov | |
| 6,286,211 B1 | 9/2001 | Turnquist et al. | |
| 6,299,824 B1 * | 10/2001 | Mayr et al. | 266/87 |
| 6,378,873 B1 | 4/2002 | Mayer et al. | |
| 6,382,632 B1 | 5/2002 | Chupp et al. | |
| 6,406,027 B1 | 6/2002 | Aksit et al. | |
| 6,431,827 B1 | 8/2002 | Wolfe et al. | |
| 6,460,857 B1 | 10/2002 | Turnquist et al. | |
| 6,464,230 B1 | 10/2002 | Tong et al. | |
| 6,499,742 B1 | 12/2002 | Zhou | |
| 6,502,825 B2 | 1/2003 | Aksit et al. | |
| 6,505,835 B2 | 1/2003 | Tong et al. | |
| 6,547,256 B2 | 4/2003 | Aksit et al. | |
| 6,550,777 B2 | 4/2003 | Turnquist et al. | |
| 6,619,669 B2 | 9/2003 | Zhuo et al. | |
| 6,681,486 B2 * | 1/2004 | Flower | 29/889.2 |
| 6,913,265 B2 * | 7/2005 | Datta | 277/355 |
| 7,181,843 B1 * | 2/2007 | Tabbita et al. | 29/888.3 |
| 7,334,311 B2 * | 2/2008 | Addis | 29/520 |
| 2007/0079493 A1 * | 4/2007 | Couture et al. | 29/464 |

* cited by examiner

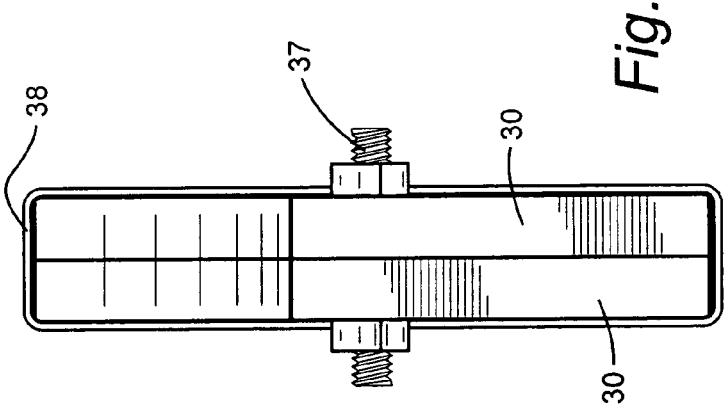
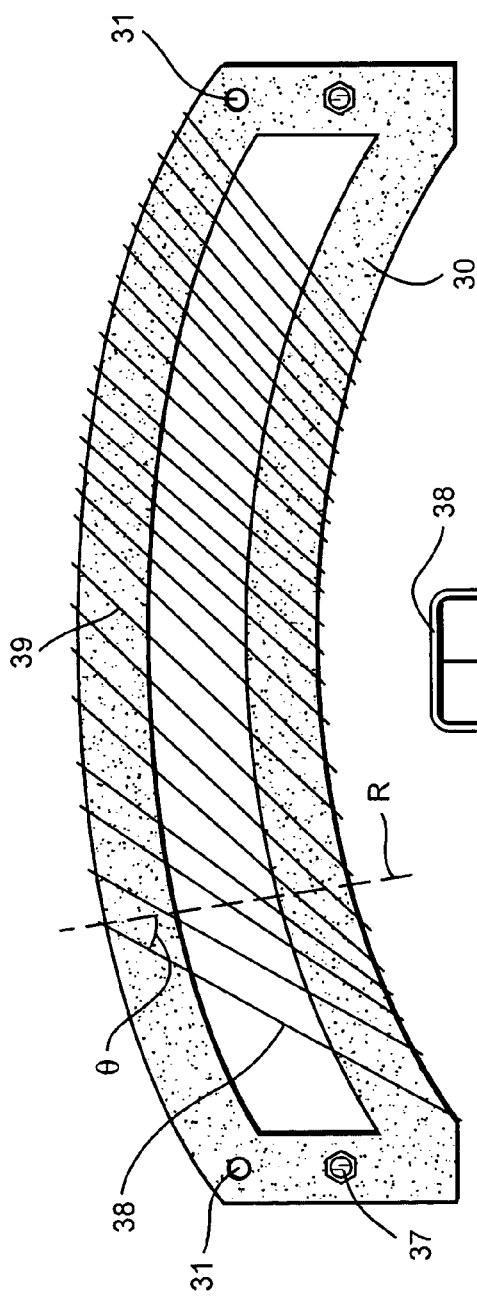
Fig. 5
Fig. 4

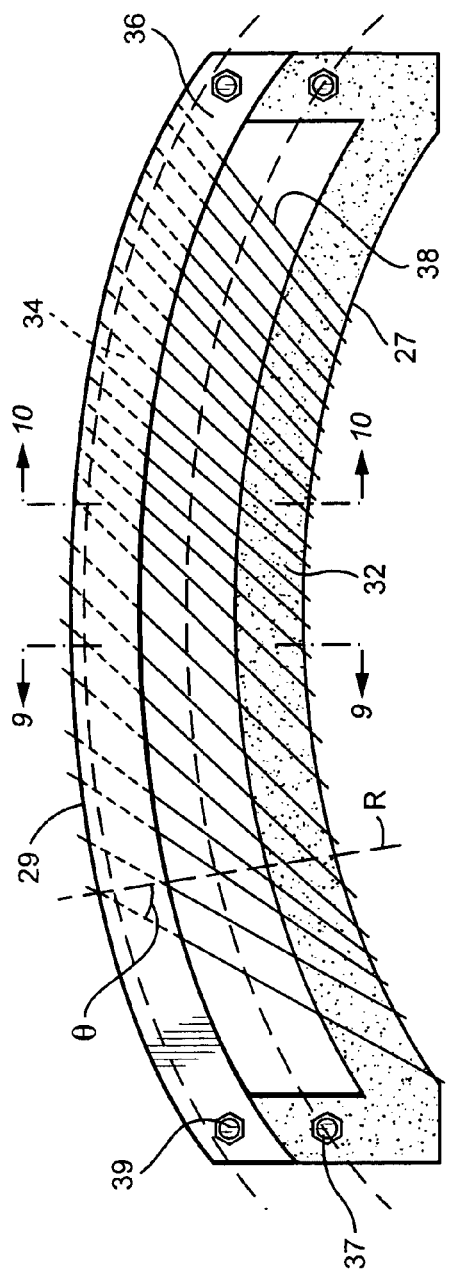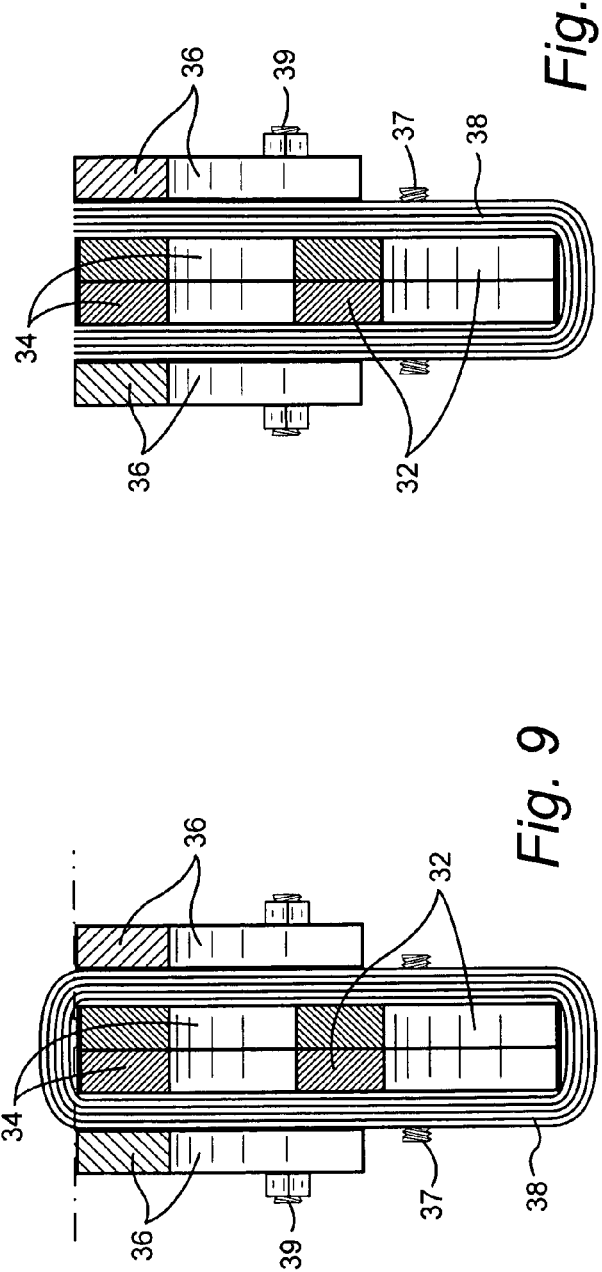

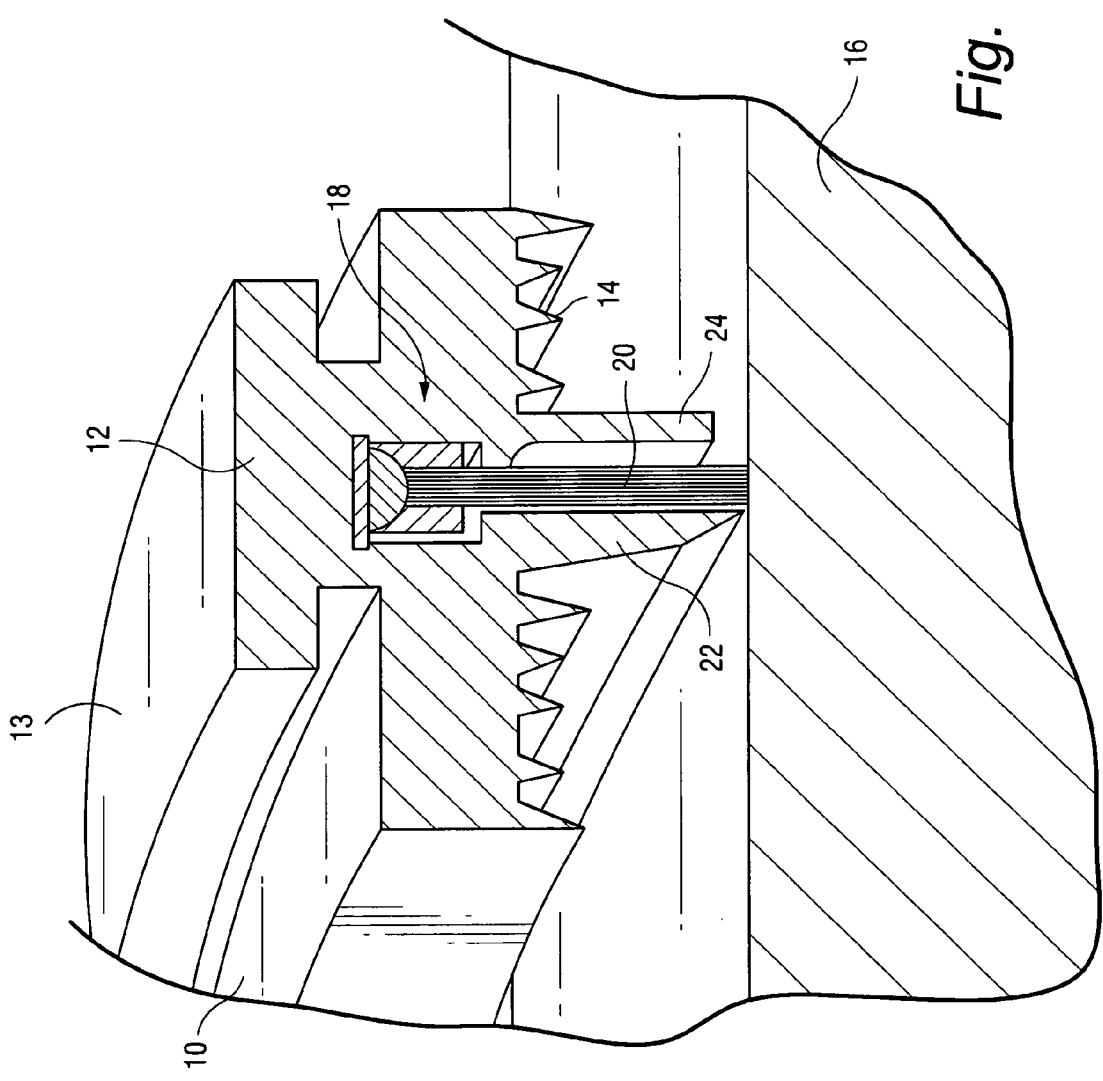

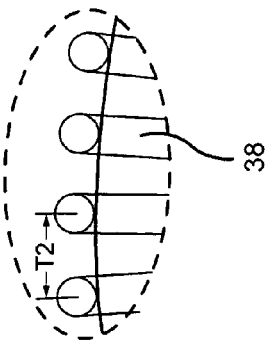
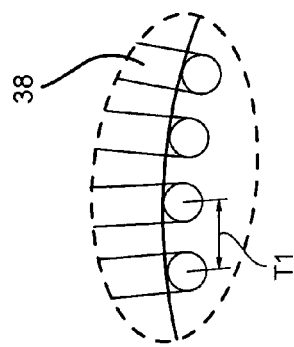
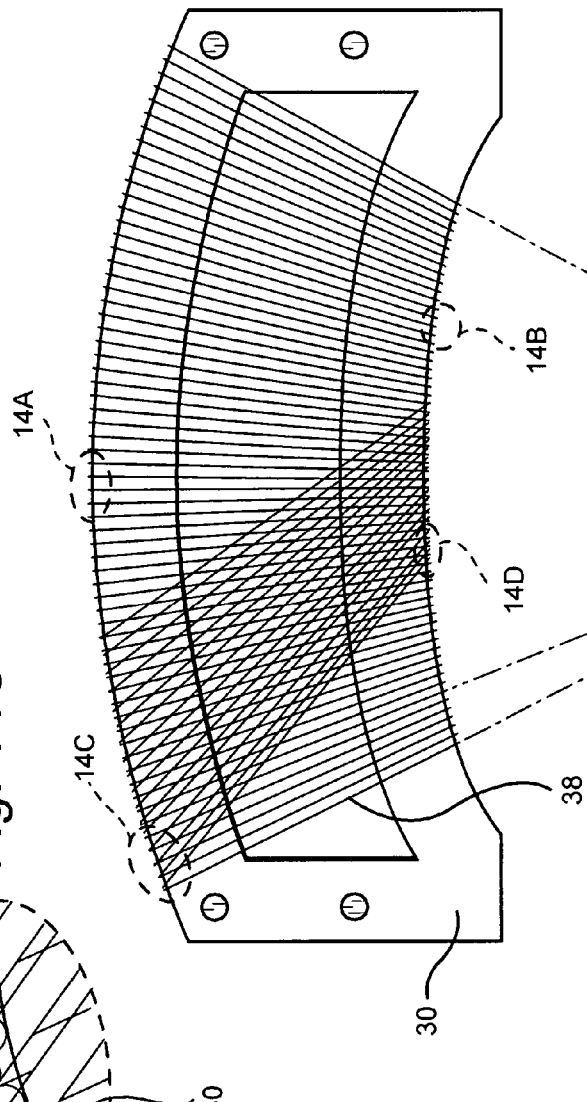
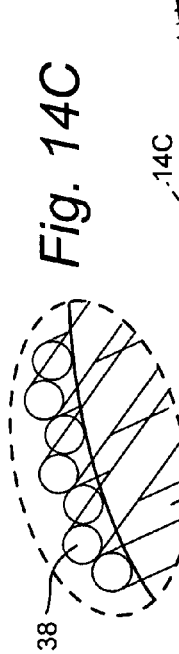
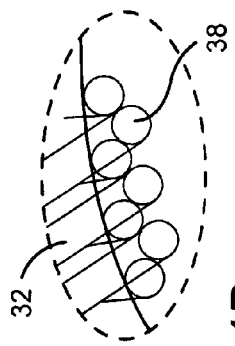
Fig. 14A
Fig. 14B
Fig. 14
Fig. 14C
Fig. 14D

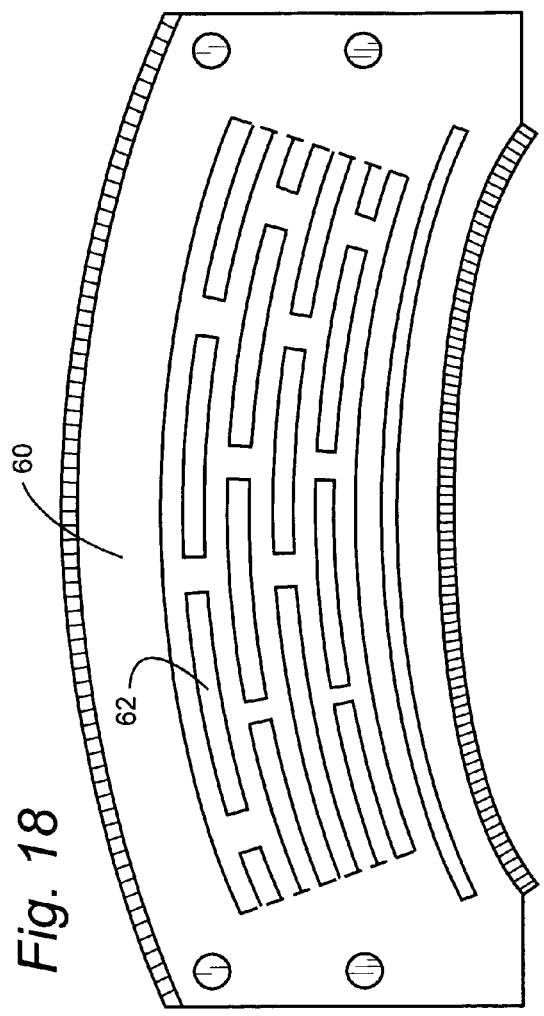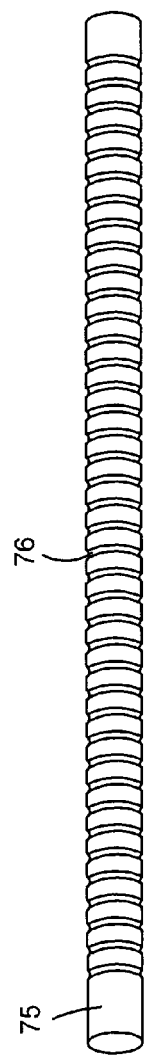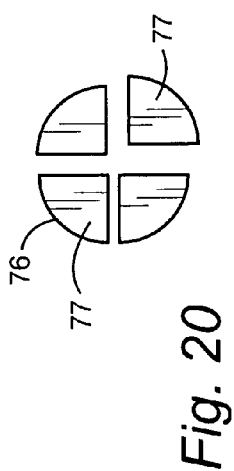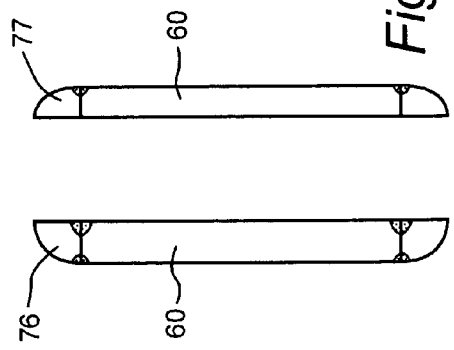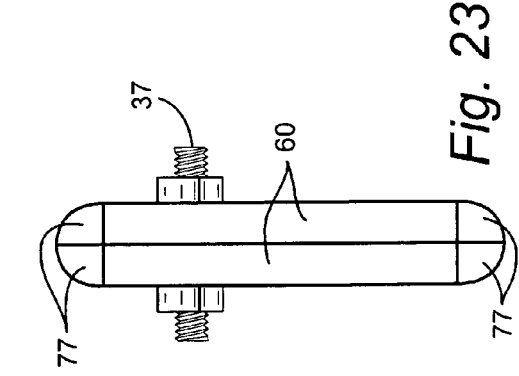

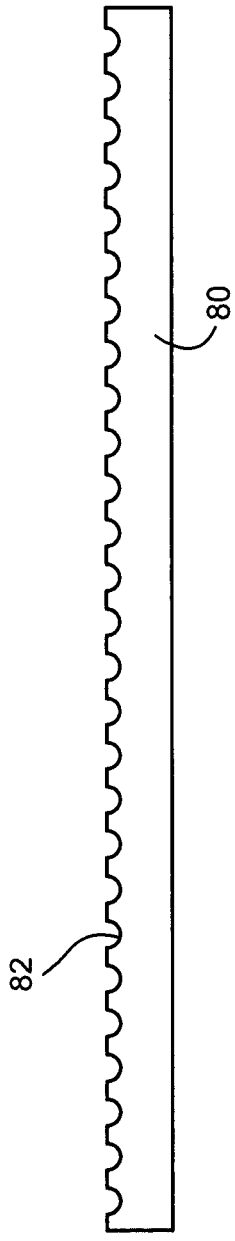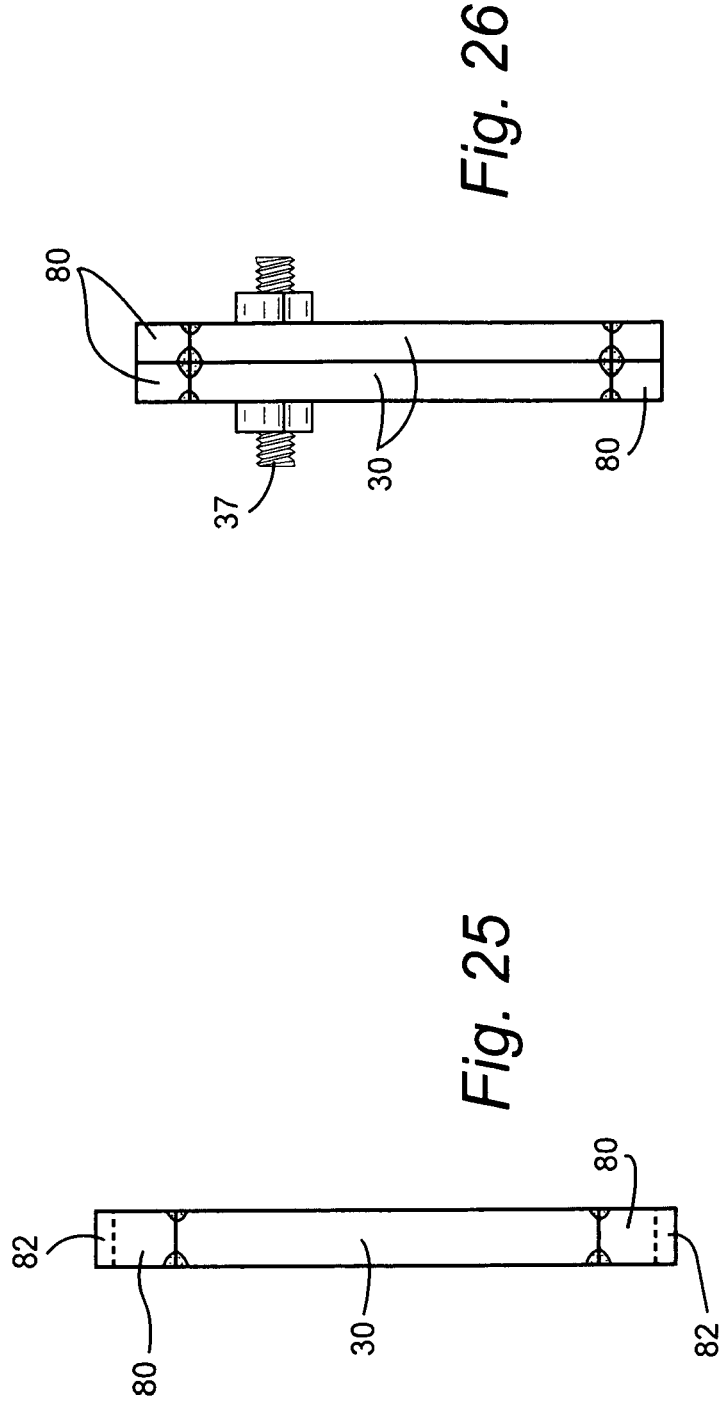

US 7,565,729 B2

METHODS OF MANUFACTURING A SEGMENTED BRUSH SEAL FOR SEALING BETWEEN STATIONARY AND ROTARY COMPONENTS

BACKGROUND OF THE INVENTION

The present invention relates to methods of manufacturing a brush seal and particularly relates to methods of manufacturing generic brush seals to required sizes e.g., diameters in segments with enhanced efficiency, minimum costs and reduced manufacturing time.

Brush seals are typically employed for sealing between stationary and rotary components, e.g., packing about a rotary shaft in a turbine, and between high and low pressure regions on opposite sides of the seal. Conventional bristle packs forming brush seals, particularly in high temperature environments, require precise placement of superalloy bristles while maintaining tight tolerances. It will be appreciated that particular angles and varying separation between the bristles are required and for different diameter applications. Current methods of manufacture essentially require manual orientation of the bristles on a machined fence. As will be appreciated, this is a time consuming and costly method of manufacture. Accordingly, there is a need for methods of manufacturing brush seals in which lower cost generic brush seal segments can be fabricated with increased accuracy, precision and placement of the bristles and hence improved quality of the seal and pressure distribution within the bristle pack during operation.

SUMMARY OF THE INVENTION

A method of manufacturing a brush seal comprising: a) winding wire about a subassembly including first and second form plates in back-to-back relation to one another to form first and second spaced runs of wire along opposite sides of the subassembly and about first and second opposite edges of the form plates; b) securing first and second elongated elements to and on opposite sides of the subassembly adjacent the first form plate edges with the first and second elements overlying portions of the first and second wire runs respectively; c) removing portions of the wound wire overlying the first edges of the form plates leaving portions of the wire runs extending respectively between the first and second elements on the opposite sides of the subassembly and wire portions about the second of the form plates edges; d) securing the first run portion, the first element and the first form plate to one another; e) securing the second run portion, the second element and the second form plate to one another; f) removing (i) remaining portions of the wire extending about the second edges of the form plate and (ii) portions of the form plates adjacent the second edges thereof leaving the first and second wire run portions cantilevered from the form plates and elements; and (g) separating the first and second form plates from one another to form a pair of brush seal segments.

BRIEF DESCRIPTION OF THE DRAWINGS

FIG. 4 is an end elevational view of a pair of full form plates secured back-to-back to one another;

FIG. 5 is a side elevational view of the form plates of FIG. 4 with wire wrapped about the plates;

FIG. 8 is a side elevational view of a half form plate secured to a full form plate on one side of the subassembly of wrapped full form plates;

FIG. 9 is an end elevational view of the form assembly of FIG. 8;

FIG. 10 illustrates the form assembly of FIG. 8 with an edge of the wire wrap about the full plates being removed;

FIG. 13 illustrates a packing ring segment having a combination labyrinth and a brush seal formed in accordance with a preferred embodiment of the invention;

FIG. 14 illustrates a method of initially wrapping the wire radially about a form followed by angular wrapping of the wire about the form;

FIGS. 14A-14D are enlarged fragmentary views illustrating the spacing of the radial wrappings (FIGS. 14A and 14B) and the subsequent angular wrappings (FIGS. 14C and 14D);

FIG. 18 is a side elevational view of a pressure balance plate with grooved or recessed edges formed by the addition of the boundary parts of FIGS. 19-23;

FIGS. 19-23 illustrate the formation of discrete boundary parts for securement along edges of a form plate to provide for an initial wire wrap;

FIGS. 24-26 illustrate recessed rectilinear edges which can be secured to opposite edges of the form plates to facilitate the initial wire wrap;

DETAILED DESCRIPTION OF THE INVENTION

Figure 1:
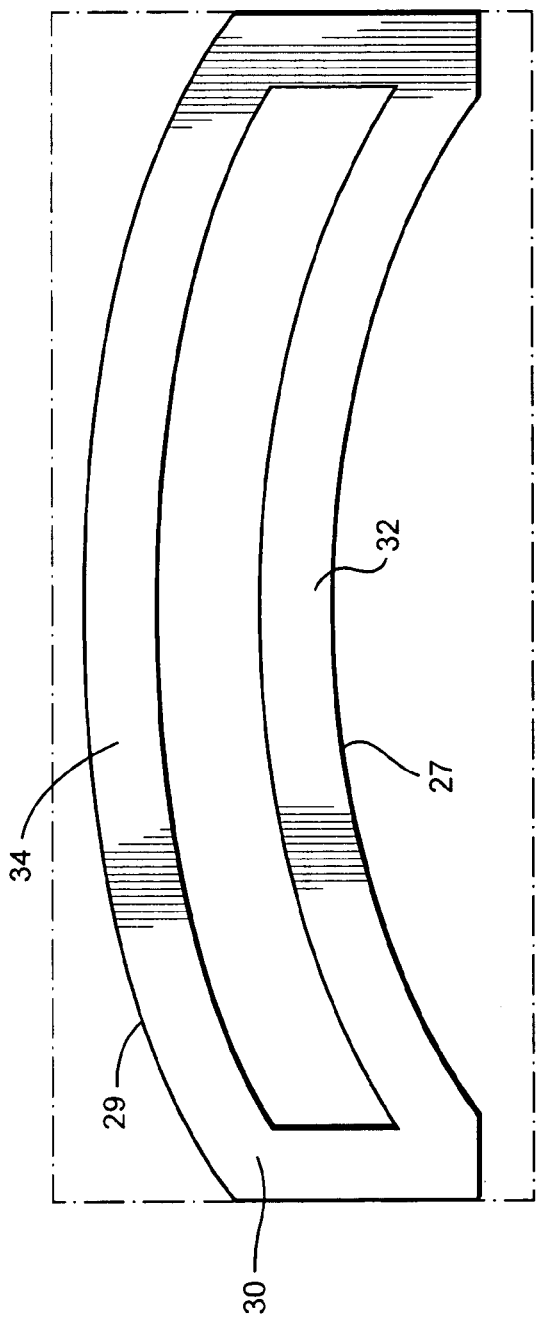
FIG. 1 is a side elevational view of a form, e.g., a full plate used in brush seal segment manufacturing methods hereof.

Referring now to the drawings, particularly to FIG. 13 there is illustrated a packing ring 10 including a dovetail 12 on one side for securement to a stationary component 13 and a plurality of labyrinth teeth 14 on an opposite side for sealing with a rotary component 16. As illustrated, a brush seal, generally designated 18, is disposed within an arcuate slot of the packing ring 10 and includes a plurality of bristles 20, tips of which sealingly engage along the surface of the rotary component. A pressure plate 22 and a fence 24 are machined on the packing ring and lie on respective opposite sides of the bristles 20. The brush bristles 20, as is conventional, are typically angled or canted in the direction of rotation of component 16 and each bristle forms an acute angle with an intersecting radius of rotor 16. The packing rings 10 are preferably formed in segments to complete an annular brush seal about the rotary component. Set screws, not shown, for example along the outer diameter of the packing ring may be used to secure the brush seal 18 in the packing ring slot.

Figure 3:
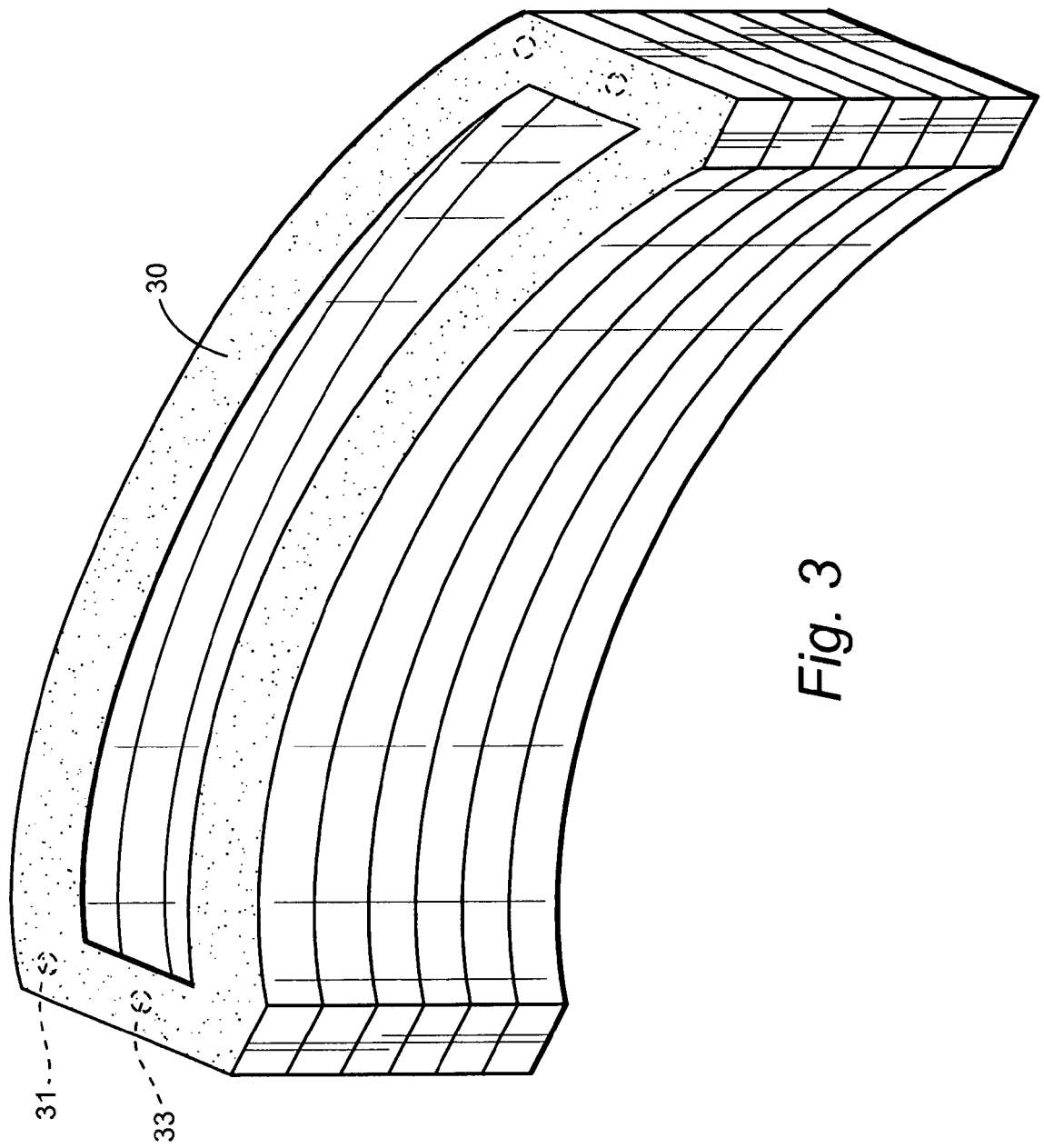
FIG. 3 is a perspective view illustrating a stack of full form plates.

To form brush seal segments for use with segmented packing rings, there is provided in accordance with a preferred aspect of the present invention a full form plate 30 (FIG. 1) cut to provide arcuate inner and outer frame members 32 and 34, respectively from rectangular plate stock indicated by the dot-dash lines of FIG. 1. Frame members 32 and 34 define inner and outer edges 27 and 29, respectively. Each full form plate 30 is provided in a length in excess of the segment length otherwise necessary in conjunction with a number of other similar segments to form a given diameter for a 360° brush seal. Each plate 30 therefore has an extra length to facilitate wrapping and handling during the manufacture of the brush seals and which extra length is cut or removed later in the manufacturing process. The opposite ends of the full plate may have additional geometry extensions for holding the plate to fixtures, not shown, during wire wrapping. Referring to FIG. 3, there is illustrated a stack of full form plates 30 aligned relative to one another. Thus, a pair of holes 31 and 33 at each of the opposite ends of each plate may be drilled in respective accurate registry with one another throughout the stack of adjacent plates. This insures accuracy and repeatability of the brush seal formed using these full form plates 30 as described below.

Figure 2:
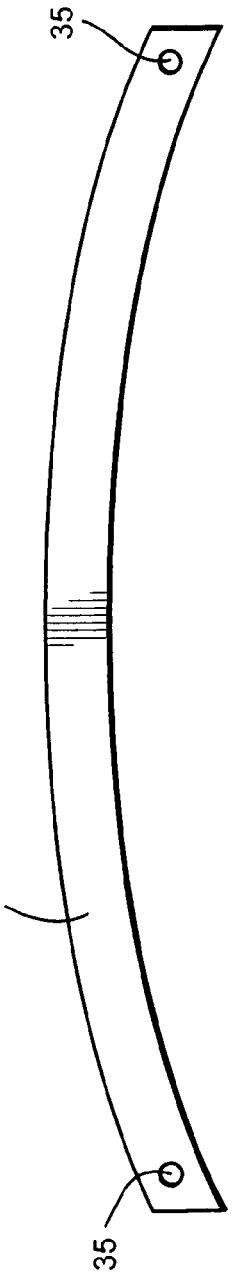
FIG. 2 is a side elevational view of another form, e.g., a half plate used in the methods hereof.

Referring back to FIG. 2, there is illustrated a half form plate 36, sometimes referred to as element 36, cut to provide a similar number of segments as the full form plates 30 and corresponding in number to the number of segments required to make a complete 360° brush seal. As with each full form plate 30, each half form plate 36 may include an extra length at opposite ends for handling and which extra length is removed later in the process. The half form plate 36 may also have additional geometry extensions at the ends for holding the plate in fixtures, not shown, during wire wrapping. As noted previously, by stacking the full form plates 30 relative to one another, the holes 31 and 33 may be accurately formed through the stacked fuel plates. Similarly, the half form plates 36 may be stacked to form holes 35 at the opposite ends thereof at locations corresponding to the holes 31 in the full plates 30. It will be appreciated that the stacking of the full form plates 30 and half form plates 36 may involve various types of fixturing and alignment equipment, not part of the present invention.

After the holes 31, 33 are formed in the full form plates 30 and the holes 35 in the half form plates 36, a pair of full plates 30 are disposed in back to back relation one to the other as illustrated in FIG. 4. Bolts 37 are passed through the aligned openings 33 of the pair of full form plates 30 and nuts are applied to secure the plates in back-to-back relation to one other. It will be appreciated that other types of securing devices may be used to secure the pair of plates 30 in back-to-back relation as illustrated e.g., clamps, adhesives and the like. As illustrated in FIG. 4, and in a preferred embodiment to reduce slippage when wrapping wire at a 35-45° angle about the full form plates 30, the opposite edges of the back-to-back full form plates 30 may be provided with coatings, e.g., rubberized coatings, tapes, or other materials to provide a relatively non-slip surface to accommodate the wrap angle of the wire. This will ensure that the wire wrap does not slip about the arcuate edges of the back-to-back full form plates 30 during wire wrapping.

Figure 6:
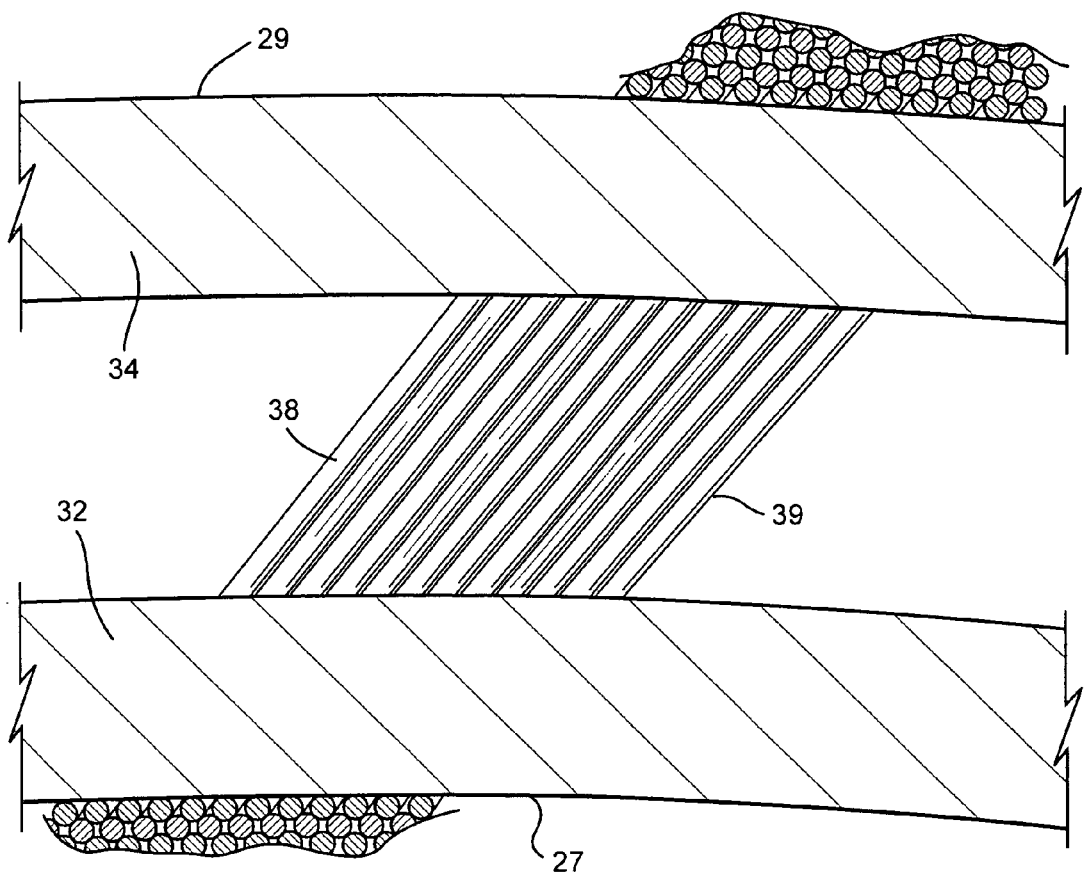
FIG. 6 is an enlarged fragmentary cross-sectional view of a full form plate illustrating portions of the wire wrap.
Figure 7:
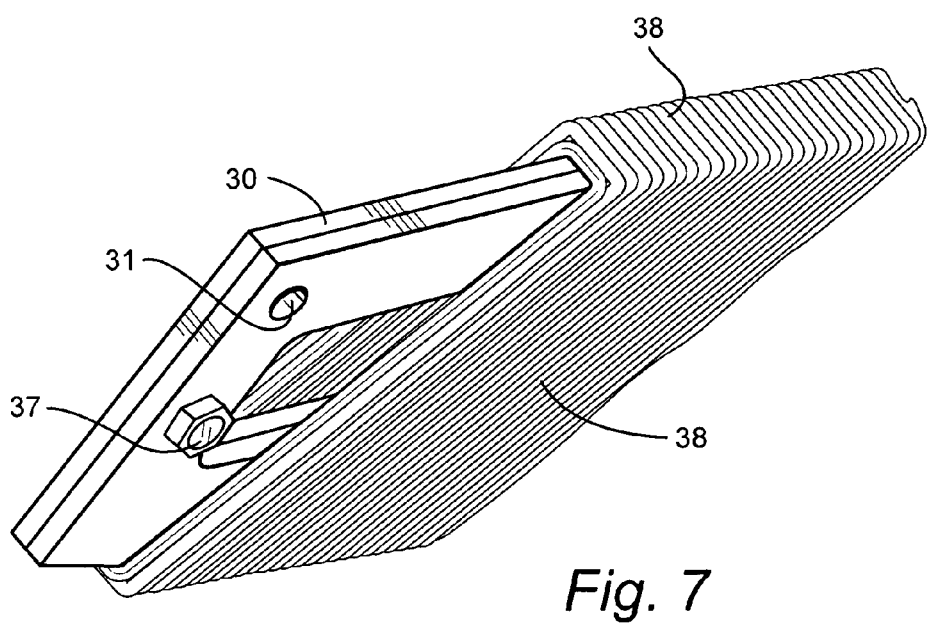
FIG. 7 is a fragmentary perspective view thereof.

With the full form plates 30 in back-to-back relation, secured by bolts 37, this subassembly is mounted on a four axis coiler or winder. The middle of the ends of the subassembly or corner/surfaces or any other reference indicia may be used as part of the alignment for reference by the wrapping machine. A continuous wire 38 is then wrapped about the subassembly of the full form plates 30 at the required angle relative to radii R of the arcuate edges 27 and 29 as illustrated in FIG. 5. It will be appreciated because of the differences in inner and outer diameters, there is a greater separation between the outer diameter wire strand centers than the inner diameter wire strand centers. The wire wrapping is also continuous back and forth in multiple passes along the pair of full form plates 30. The wire strands thus build up adjacent to one another and generally interdigitate with adjacent wire wrap layers as illustrated in FIGS. 6 and 7.

Figure 12:
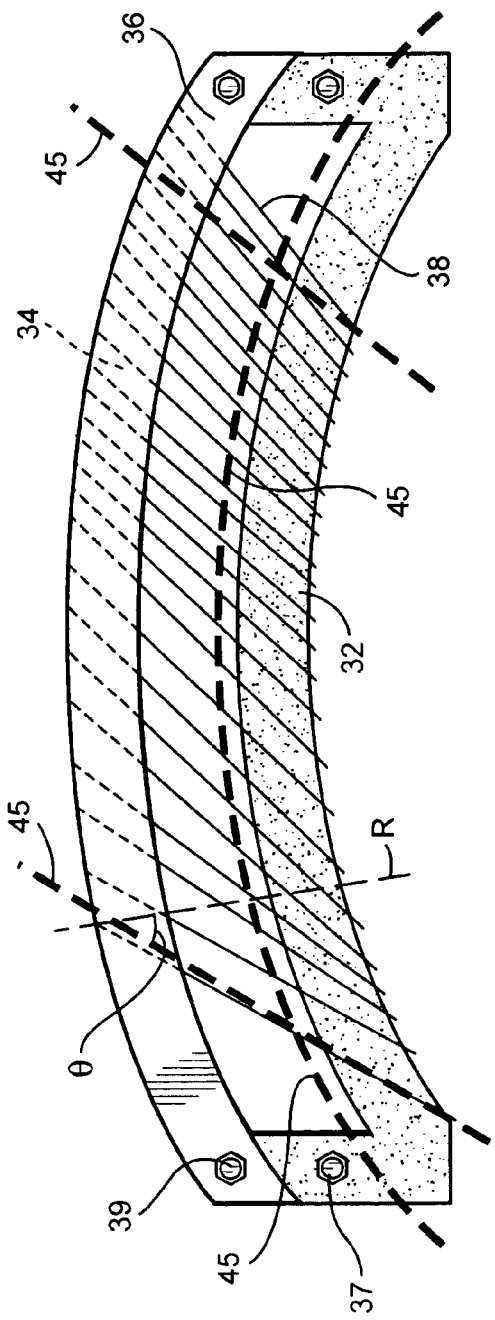
FIG. 12 is a side elevational view of the form assembly of FIG. 11 illustrating the lines of cut through the assembly to form brush seals.
Figure 11:
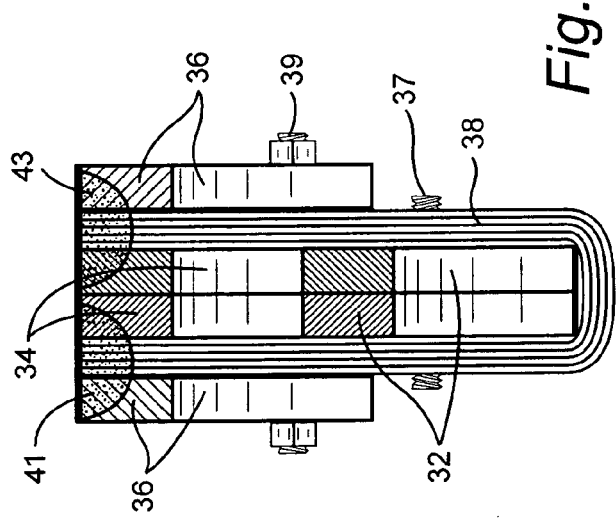
FIG. 11 is a cross-sectional view of the form assembly with the wire wrap and welds along an edge of the assembly.

With the wire wrapped about the outer (first) and inner (second) arcuate edges 27 and 29 respectively, of the back-to-back full form plates 30, and in multiple passes along those edges about the subassembly forming multiple wire runs 39 along opposite sides of the subassembly of plates 30, a half form plate 36 is secured on each of the opposite sides of the wire wrapped sub-assembly. The openings 35 of the half form plates 36 are aligned with the openings 31 of the back-to-back full form plates 30 and a bolt pin or dowel 39 (FIG. 8) is received through the aligned openings at opposite ends of the forms assembly. As illustrated in FIG. 8, portions of the runs of the wire 38 are thereby clamped between the half form plate 36 and the full form plate 30 on each of the opposite sides of the assembly. Referring to FIG. 10, the strands of the wire 38 along the outer edge 29 of each full form plate 30 and adjacent the outer edge of each half plate 36 are removed. Referring to FIGS. 10 and 11, the half form plate 36 and full form plate 30 on one side with the cut strands of the wire run portions extending therebetween are welded to one another as indicated at 41. Similarly, the half form plate 36 and full form plate 30 with the cut strands of another wire run portion extending therebetween on the other side of the assembly are welded to one another. That is, a pair of spaced welds 41 and 43 are provided along the outer margin of the assembly as shown in FIG. 11. Following the welding, the assembly is cut for example, along the solid dash lines 45 as illustrated in FIG. 12 to remove the inner margins 32 of the full form plates as well as the inner run portions of the wire strands about the inner margins of the full form plates. Additionally, the assembly is cut adjacent opposite ends along angles corresponding to the desired bristle angle e.g. along angled cut lines 45 in FIG. 12. By cutting along these lines 45 illustrated in FIG. 12, it will be appreciated that a pair of brush seal segments are formed, each brush seal segment lying between a half plate 36 and the outer frame member 34 of a full form plate 30. The cut away portions of the full form plates 30 at the opposite ends and the inner frame member 32 and including portions of the wire strands about the inner frame member 32 are discarded. Each brush seal segment can then be set up in a fixture, not shown, and finished to the appropriate inner diameter. Likewise, the opposite ends of the segments can be machine finished for mating engagement with other similarly fabricated brush seal segments to form an annular brush seal.

Referring now to FIGS. 14 and 14A-14D, and in a preferred embodiment, the first pass of wire 38 about the pair of back-to-back full form plates 30 may be provided in a radial orientation for the entire length of the full form plates 30. Thus, the distances T2 (FIG. 14A) between the center lines of adjacent wires along the outer margin of the back-to-back full form plates 30 will be greater than the distance T1 (FIG. 14B) between the center lines of adjacent wires along the inner margin of the back-to-back full form plates 30. With the initial pass of the wire 38 wrapped in a radial orientation and with those distances T1 and T2 between adjacent wire wraps, second and subsequent passes can be formed at the desired angular orientation of the wire in a manner which will resist displacement of these successive wire wraps along the margins of the full form plates 30. For example, and referring to FIGS. 14C and 14D, the subsequent wire wraps will engage, i.e., interdigitate between adjacent wires of the previous wire wraps along the outer and inner margins of the subassembly. In this manner, the wire pattern of the first pass establishes a guide pattern on which the next layer and successive layers can be wrapped at the correct angle, e.g., about 35-45° relative to radii of the assembly.

Figure 15A:
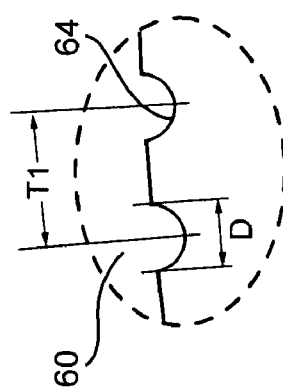
FIGS. 15A and 15B are enlarged fragmentary views of the opposite edges of the pressure balance plate of FIG. 15.
Figure 15B:
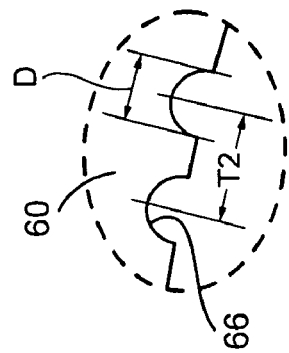
Figure 15:
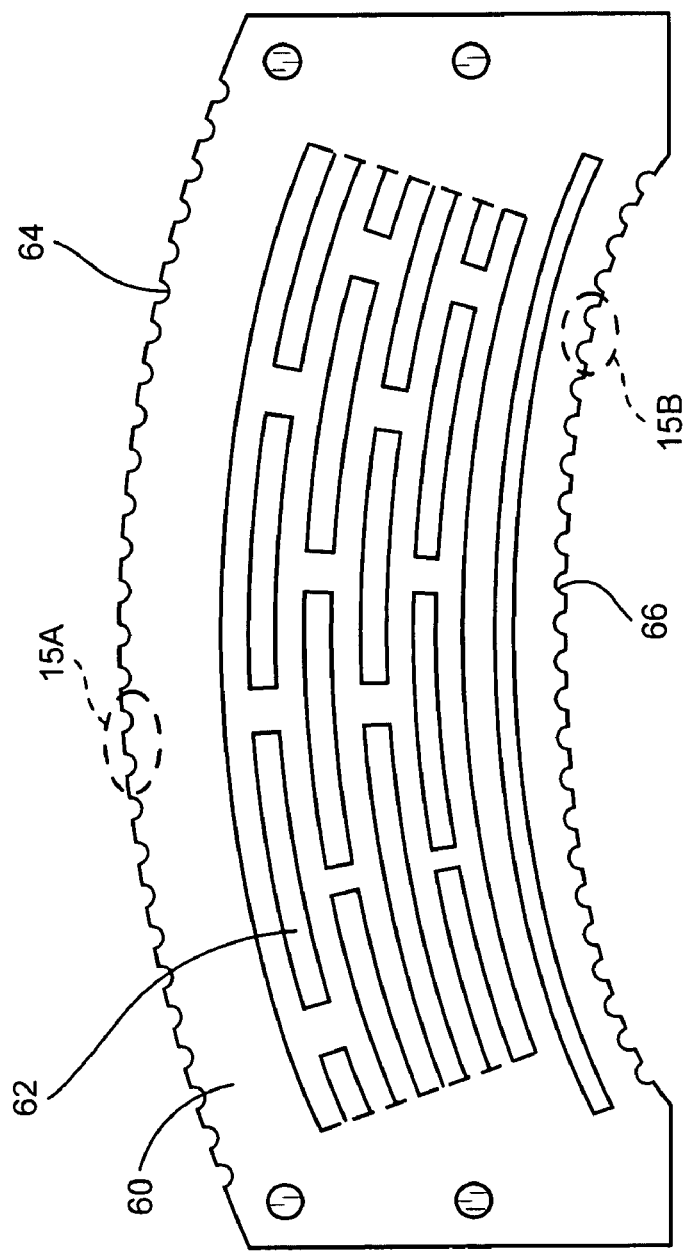
FIG. 15 illustrates a form plate including a pressure balance plate.

Referring to FIG. 15, the full form plates 30 may be in the form of bristle backing plates 60. As illustrated, each backing plate 60 is oversized similarly as the full form plates 30 and may have a plurality of circumferentially extending slots 62 arranged in radially spaced rows. Each slot 62 extends through the backing plate 60 and also extends discontinuously in circumferential directions. Circumferentially adjacent slots 62 are staggered relative to one another in a circumferential direction at each radial location relative to the adjacent radial location. Thus, the type of brush seal system described and illustrated in U.S. patent application Ser. No. 11/237,976, titled PRESSURE BALANCED BRUSH SEAL, filed Sep. 29, 2005, and other brush seal systems, may be formed using the present methods. Consequently, two of the backing plates 60 are disposed and secured in back-to-back relation to one another, similarly as the full form plates 30 are assembled. Bolts are used to secure the plates 60 to one another. The outer and inner edges of the back-to-back plates 60 may have grooves 64 and 66 formed therealong, respectively. Thus, the grooves 64 may be formed with the distances T1 between centers of the grooves 64 illustrated in FIG. 15A being greater than the distance T2 between the centers of the grooves 66 illustrated in FIG. 15B. Preferably, the grooves are slightly larger than the wire size but need not be limited to a circular groove. The first pass of wires laid into grooves 64, 66 may be at the desired angle. The grooves prevent wire slippage when second and subsequent wire passes are wound about the back-to-back plates 60. The half form plates 36 are then secured to the opposite side faces of the wire wrapped balance plates 60. Similar processes as described previously are performed to remove the excess wire wrap and the excess portions of the balance plates 60 to form the pair of brush seal segments. Each balance plate 60, preferably, extends radially inwardly to a greater extent than the half form plate 36. After welding, the brush seal segments can be disposed in the packing ring with the backing plate overlying a balanced pressure plate as in the prior mentioned patent application.

Figure 16:
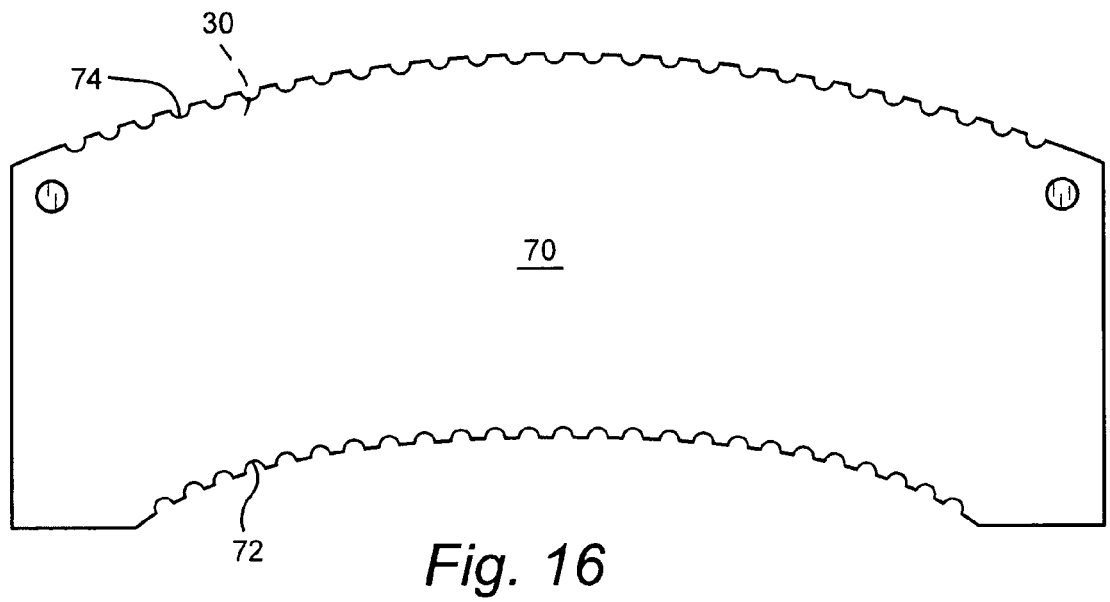
FIG. 16 illustrates an intermediate form plate having recessed edges to facilitate winding of the wire.
Figure 17:
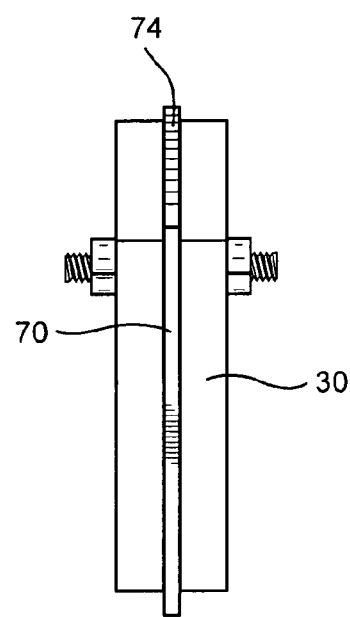
FIG. 17 is an end elevational view of a pair of full form plates straddling the intermediate form plate of FIG. 16.

Referring now to FIGS. 16 and 17, sheet or plate metal stock material 70 with grooved margins 72 and 74 exposed along the inner and outer edges may be disposed between two full form plates 30. With the full form plates 30 or pressure balanced plates 60 disposed on opposite sides of the sheet stock 70 and the assembly bolted together as illustrated in FIG. 17, the sheet stock 70 will act as a guide to hold the first pass of the wire wrap in place without slippage in the circumferential direction similarly as previously described. Upon completion of multiple passes of the wire about the subassembly, the half plates 36 are then secured to the subassembly. The excess wire wrap along the outer edges is removed and the half form plate 36 and full form plate 30 or balanced form plate 60 on each side of the form assembly can be welded to one another to form a pair of discrete brush seal segments.

Referring now to FIGS. 18-23, the full form plate is illustrated in the form of the balanced pressure plate 60 previously described but it will be appreciated that the full form plate may be any of the full form plate types disclosed herein. In order to hold the first pass of wire about the assembled back-to-back full form plates, a rod 75, preferably formed of stainless steel, is threaded on a threading machine, not shown. The threads 76 lay at an angle and width to define the first pass of the wire wrap. Alternatively, axially spaced grooves may be formed along the rod 75. The rod 75 may then be cut lengthwise into four quadrants 77 as illustrated in FIG. 20. Each quadrant 77 of course includes the threaded or grooved portions of the threads or grooves 76 formed along the arcuate outer surface of rod 75. The cut rod portions are then bent to conform to the arcuate shape along the opposite arcuate edges of the back-to-back pressure balance or full form plates 30. Those rod portions are preferably tack welded to the pressure balance or full form plates as illustrated in FIG. 22 with the thread or grooves exposed. This provides grooves for proper placement and holding of the first pass of the wire wrap at the appropriate angle as the wire is wound about the pressure balance or full form plates. Once wound, the half form plates 36 are applied to opposite sides of the subassembly. The wire wraps about the outer margins of the pressure balance or full form plates and the rod portions previously tack welded to the plates are removed. The process then continues as previously described with each of the adjacent half form plate and full form plate on each side of the assembly being welded to one another. The assembly is then trimmed to form the brush seal segments.

Referring to FIGS. 24-26 and in lieu of the rod 75 cut into quadrants as in the prior embodiment, a generally rectilinear bar 80 is provided for securement along the edges of full form or pressure balance plates 30. The bar 80 has a plurality of grooves or recesses 82 formed along a lengthwise extending edge thereof. When the bar 80 is tack welded to the margins of each of the full form or pressure balance plates as illustrated in FIG. 25, the grooves 82 are exposed along the opposite edges of the subassembly. In FIG. 26, the two full form plates are illustrated secured in back-to-back relation one to the other by the bolt and nut arrangement leaving the groove or recessed edges of the assembly exposed. This enables the wire wrap to grip the edges of the assembly without sliding relative to the assembly such that the wrap runs may extend at the appropriate angle.

Figure 27:
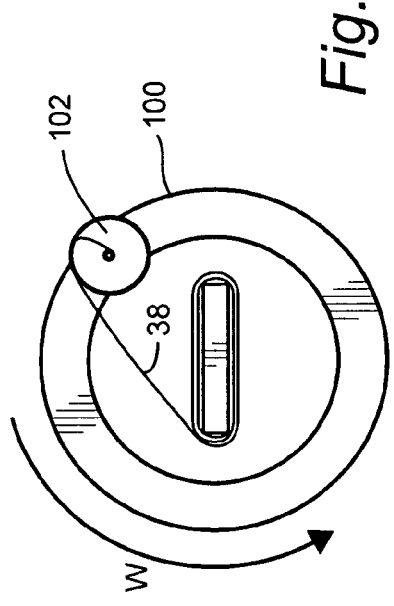
FIG. 27 is a schematic end elevational view of a portion of a wire wrapping machine for fabricating the brush seal hereof.
Figure 28:
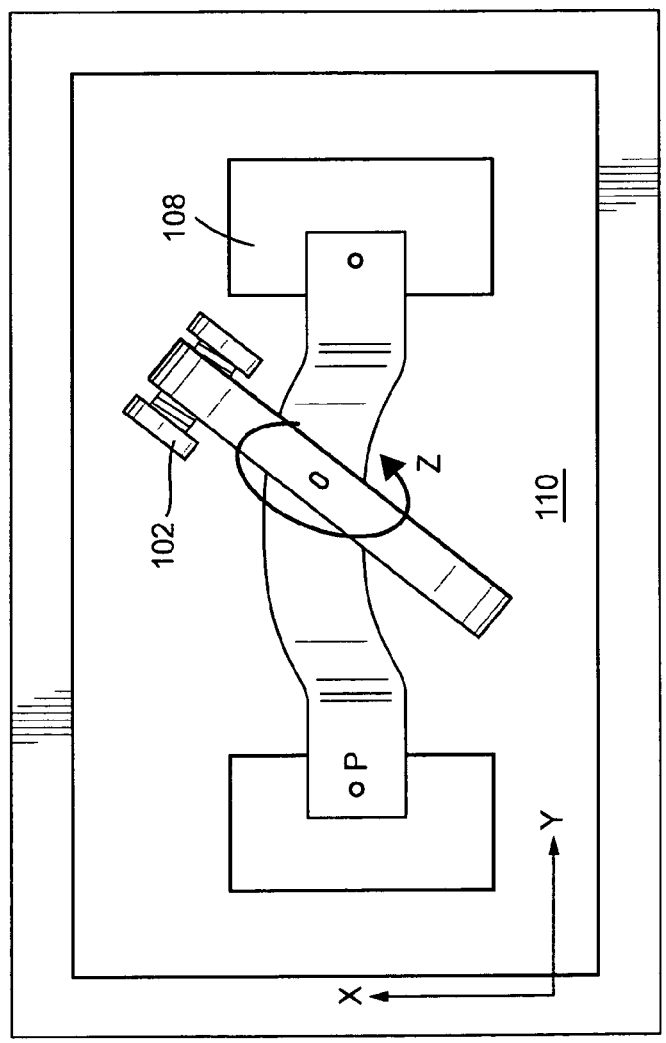
FIG. 28 is a top plan view of a wire wrapping machine including the portion shown in FIG. 27.
Figure 29:
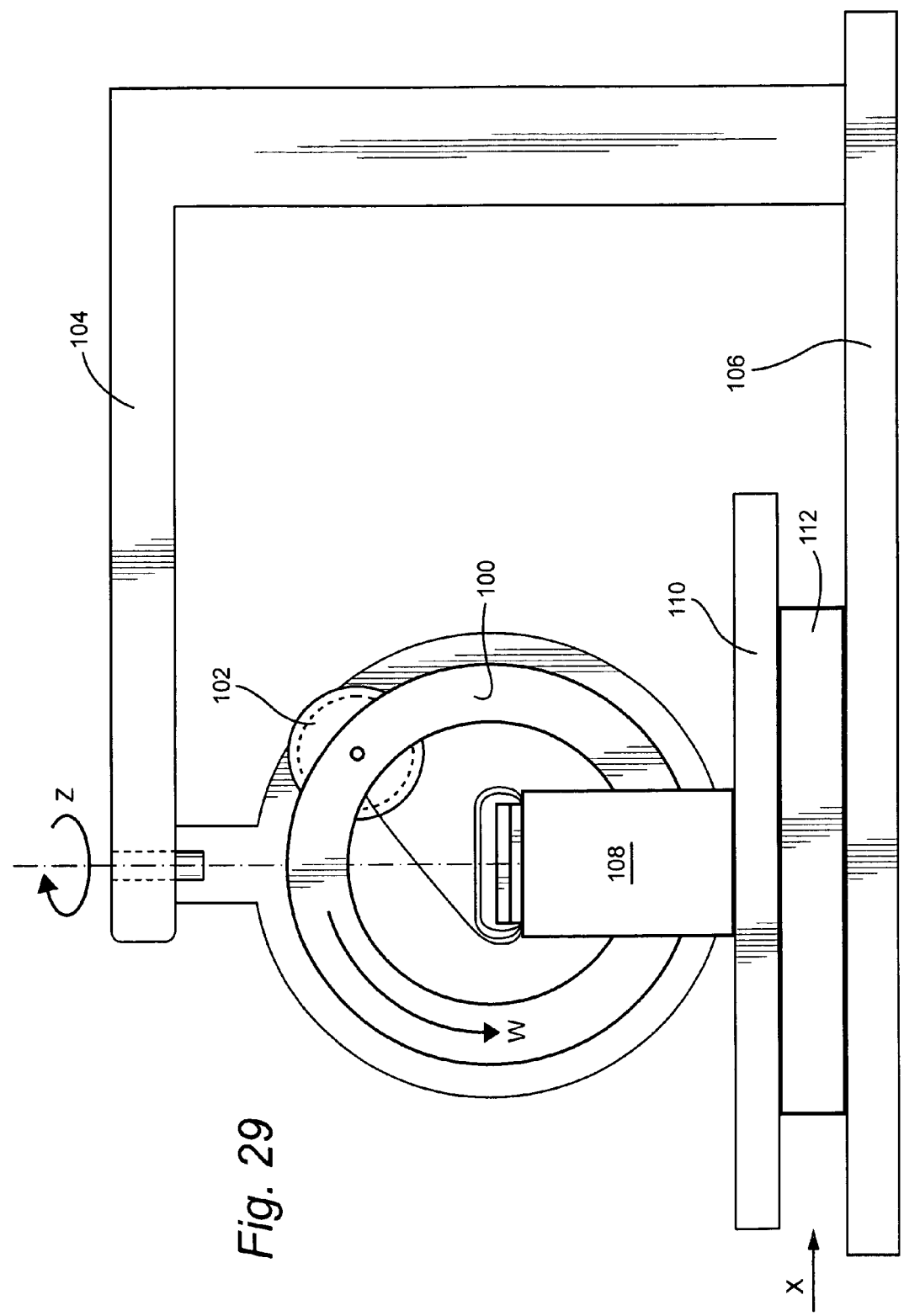
FIG. 29 is a side elevational view of the wrapper machine of FIG. 27.

Referring now to FIG. 27, there is illustrated a form of a wire wrap machine. In this form, a toroidal winder 100 carrying a wire reel 102 is rotatable in the circumferential direction W to wind or unwrap the wire 38 about the assembly of full and half form plates. As illustrated in FIG. 29, toroidal winder 100 is supported by a frame 104 for rotation about a Z axis. The latter axis is necessary to achieve the 35-45° angle orientation of the bristles forming the brush seal. The full plates 30 are mounted on fixture blocks 108 which, in turn, are mounted on a table 110 slidable along the base 106 of the support frame 104 in an X direction via tracks 112. Thus, as illustrated in FIG. 29, the toroidal winder 100 is supported by and rotable relative to stand 104 mounted on a fixed machine base 106. The form plates 30 are mounted on fixture blocks 108 in turn carried by base 110 moveable in the X direction.

Base 110 is mounted for movement in an XY plane relative to the machine base 106. By using this mounting arrangement, the center of the toroidal winder 100 may follow the center of the wrap of the assembly of form plates. The toroidal winder 100 also rotates about the vertical Z axis to achieve the desired wire wrap angle, about 35-45° for a brush seal application. It will be appreciated that other wrap angles may be required for certain brush seals and that the present invention is not limited to a wrap angle of about 35-45° relative to a radius of the seal.

Figure 30:
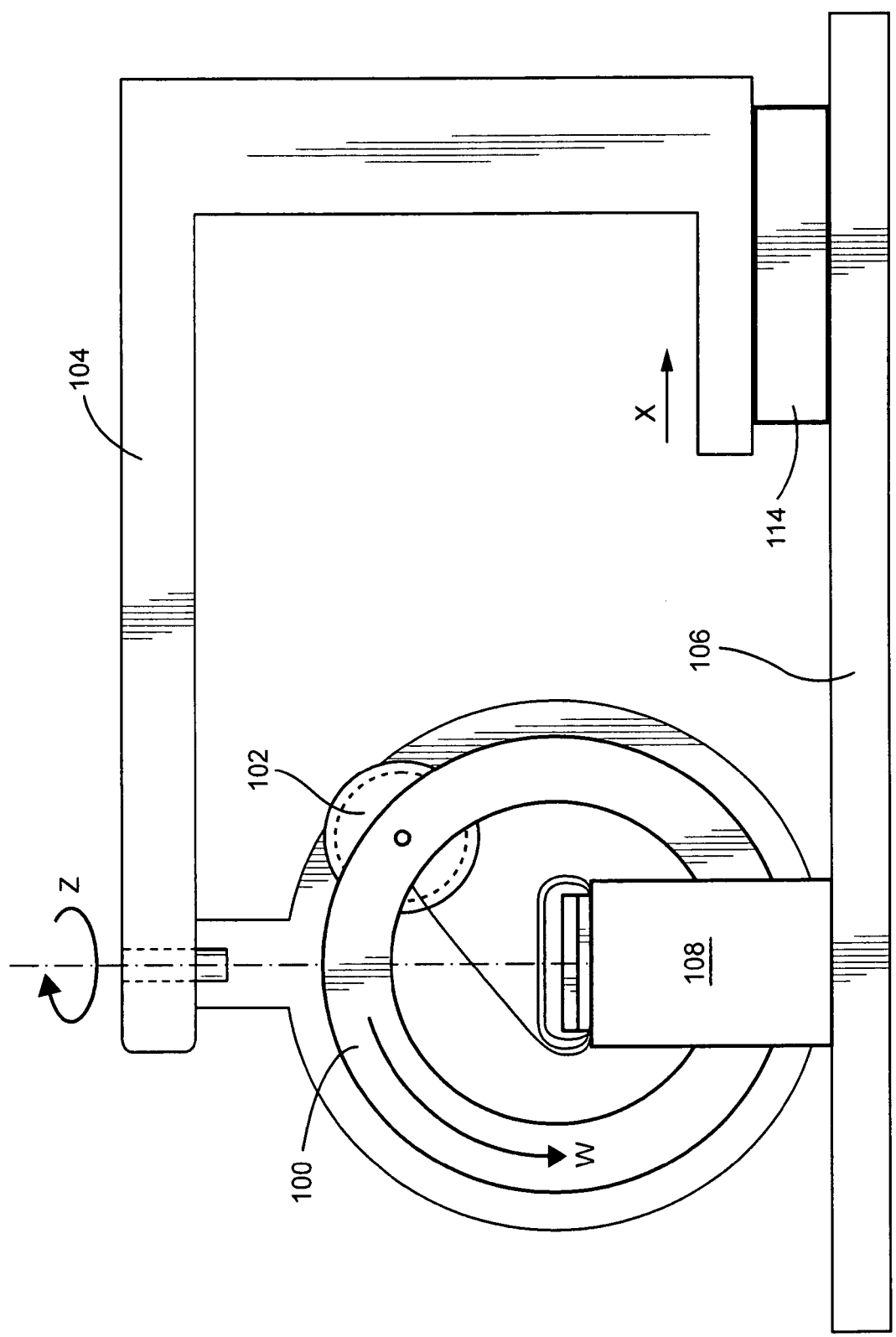
FIG. 30 is a side elevational view of another embodiment of a machine for wrapping wire about forms to fabricate a brush seal.

In an alternative form of the wrapping machine illustrated in FIG. 30, the assembly of form plates 30, 36 are fixed to the base 106 via the fixtures 108. The stand 104, however is mounted for XY movement relative to the base 106 via tracks 114.

Figure 31:
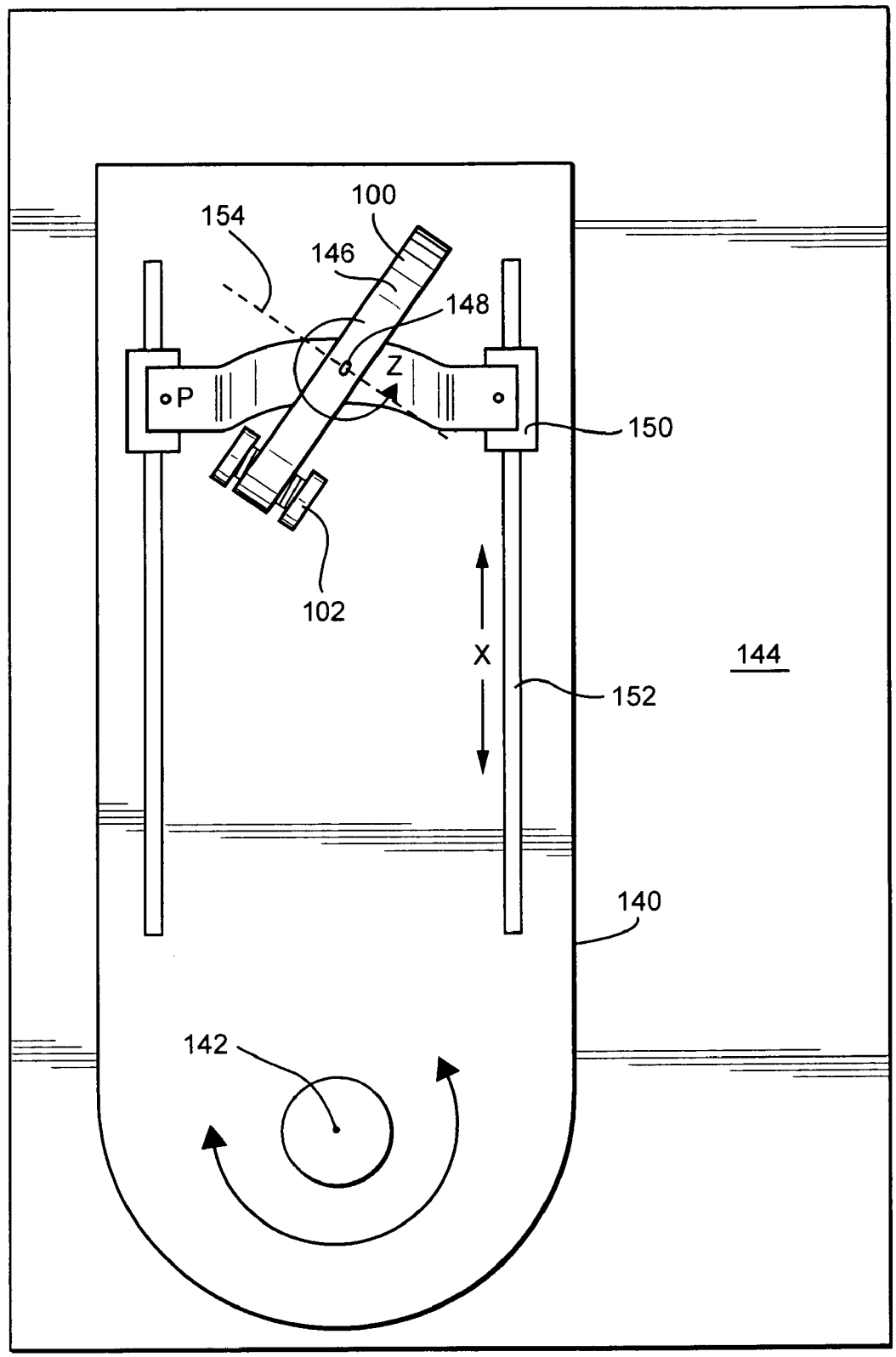
FIG. 31 is a top plan view of a further embodiment of a wire wrapping machine for forming brush seals.

Referring to a still further embodiment of the wire wrapping machine illustrated in FIG. 31, a support table 140 is pivotally mounted about an axis 142 relative to a fixed support 144. The fixed support 144 supports the toroidal winder 146 for rotation about an axis 148. The toroidal winder 146 is similar to the toroidal winder disclosed in the prior embodiments. The axis 148 is necessary to achieve the wire wrap angle. The full form or balance pressure plates 30 are mounted on fixture blocks 150. The fixture blocks 150 are slidable in an X direction on tracks 152. The distance from the axis 142 to the axis 148 is initially approximately set via displacement of the toroidal winder and the full form plates along the X axis to correspond to the radius of the segment to be wrapped. With the toroidal winder 146 rotating about an axis 154, the winder wraps wire from the reel 102 initially in a radial direction and then the winder 146 is rotated to the preset angle to wrap wire strands about the angle. Movement of the parts about the various axes are under numerical machine control and as such, move together to achieve the wire wrap configuration.

In the preceding drawing FIGS. 27-31, the wire wrap machines are specific to toroidal windings where the spool of wire is displaced about the part. However, a fly winding process may be utilized instead where the spool itself is not wrapped around the part. Wire is drawn off the spool and wrapped around the part by the fly head. This results in a 360° twist of the wire strand per revolution. Thus, the machines of FIGS. 27-31 may be used with a fly winding head.

Figure 32:
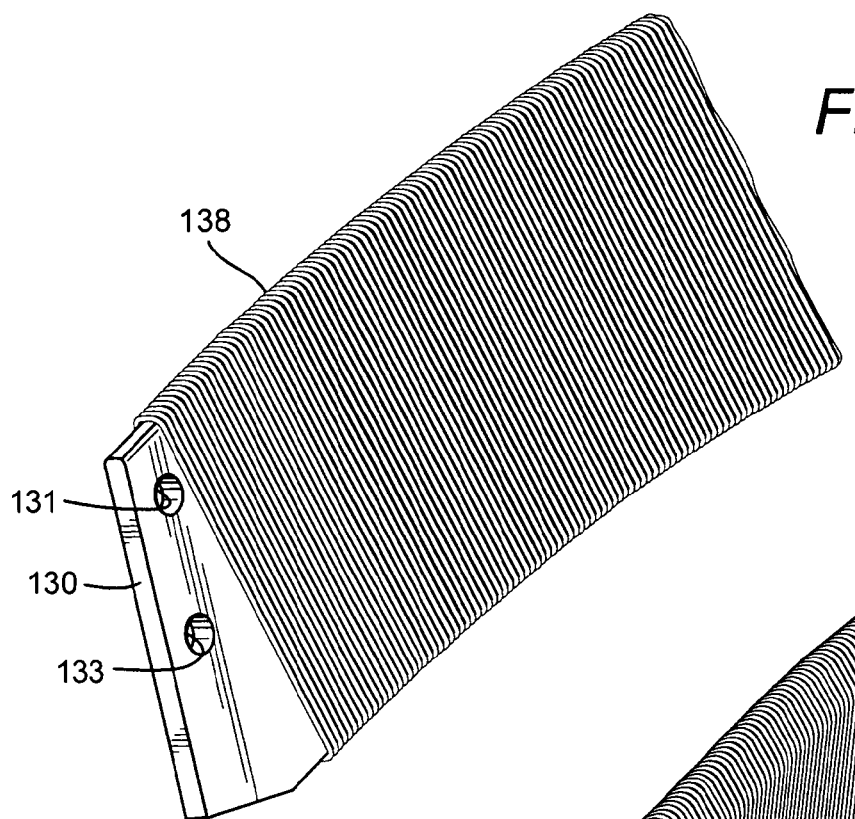
FIG. 32 is a fragmentary perspective view of an intermediate form plate with radial wire wrap.
Figure 33:
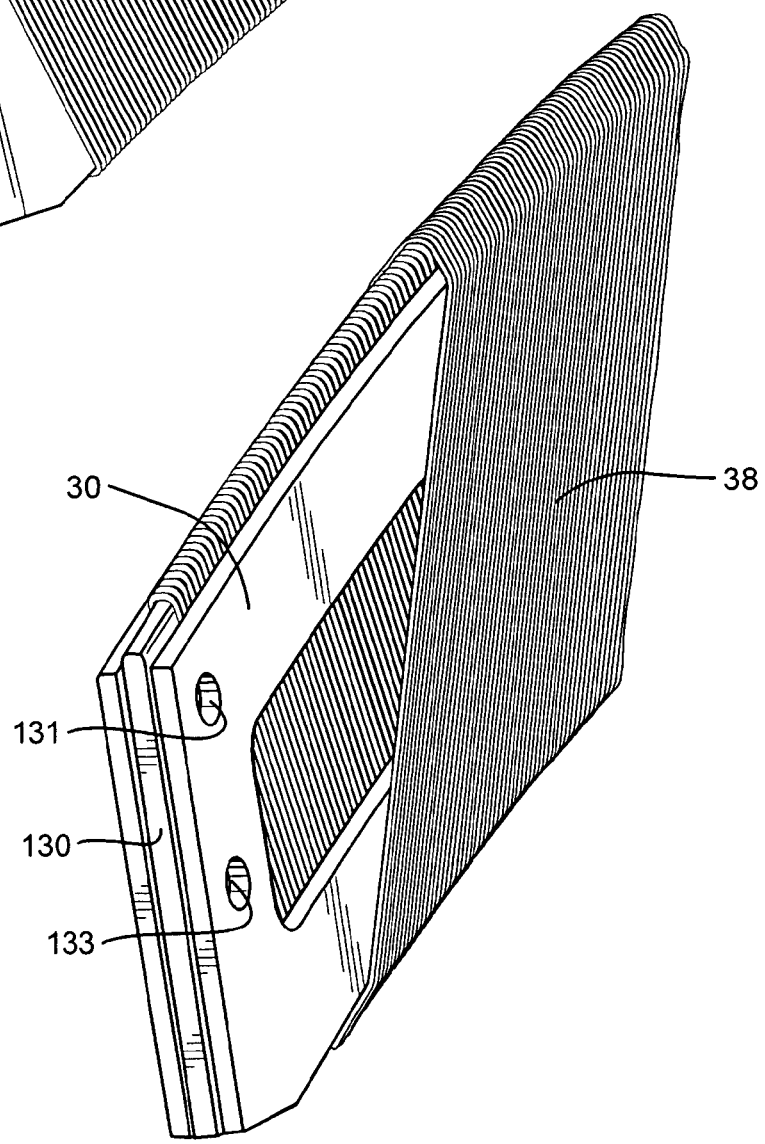
FIG. 33 is a similar view with full form plates straddling the intermediate plate and wire wrapped at an angle.
Figure 34:
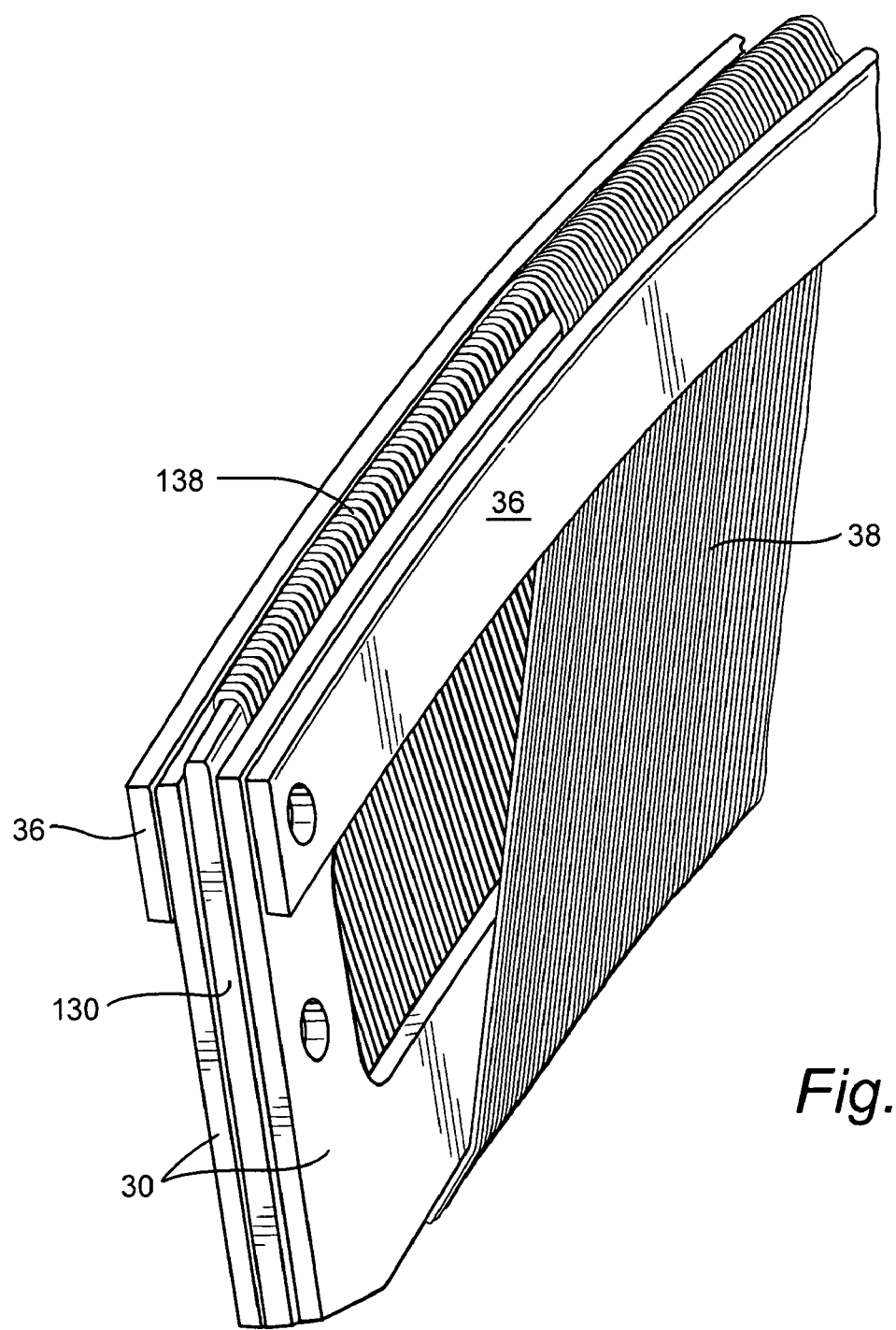
FIG. 34 is a view similar to FIG. 32 with the half form plates applied.

Referring now to the embodiment illustrated in FIGS. 32-34, there is illustrated a further form of the invention for preventing slippage of the wire wrap about the form assembly when wrapping the wire runs at the appropriate angle relative to a radius. In FIG. 32, a curved plate of sheet metal stock 130, for example having smooth arcuate edges and holes 131 and 133 at opposite ends corresponding in location to holes 31 and 33, is initially wrapped with guide wire 138 in a single pass in a radial direction. The wire is thus wrapped about the curved plate with radially oriented wire strands with a separation T1 between the wire centers along the outside diameter of the plate 130 and a separation T2 between the inside wire centers along the inner diameter as previously discussed. This radial wrap can be performed on the same machines as the angle wrap, i.e., the machines illustrated in FIGS. 27-31 and can be performed in lieu of notching or applying grooves or recesses to the margins of the form plates.

Once the plate has been wrapped in a radial direction, the radially wire wrapped plate is sandwiched between full form plates 36 or pressure balance plates 60 as illustrated in FIG. 33. With the full form plates 30 or balanced pressure plates 60 straddling and secured to the intermediate radially wire wound plate 130, the wire centers of the radially wrapped intermediate plate may be used as a wire guide to wrap the next wire runs about the subassembly at the appropriate angle. Once this subassembly is wrapped with wire in multiple passes and the wire extends at appropriate angle, the outside or half plates 36 are secured to the subassembly to form an assembly which can be separated to form two arcuate brush seal segments. That is, once the half form plates 36 are applied to the subassembly, the welds can be applied along the outer margin of each adjacent pair of full form and half form plates similarly as previously described. The wire wrapped at the angle is first removed along the outer margin prior to welding. The radially wrapped center plate 130, once the welds have been completed, and the two brush seal segments are then separated from the assembly. The wire wound center plate 130 can be re-used for the formation of further brush seal segments.

It will be appreciated that the brush seal grade wire wrapped about the stock material or part has a memory and residual wire tension may be undesirable during welding. Also, wire off the spool has a curved memory which is undesirable when taking the straight shape along the side of the plate. Therefore, it may be desirable to heat treat the part either prior to welding or alternatively after welding but before cutting the radially inboard strands to the final rotor interior diameter. During the winding of an angled (35 to 45 degrees) layer of wire, it is desirable to fully or partially melt the wire being wrapped to the previously layer below it to avoid slipping. To achieve this, a pulsed YAG laser focusing head is mounted on the wrap machine and synchronizes its firing to the movement of the wrap head to weld the wire. In this situation, a fiber optical bundle would transmit the light to the focusing head which is mounted to the wrap machine. It would fire a focused pulse at the previous wrapped strand, or a strand some number behind the strand being currently wrapped. It would instantaneously partially of fully melt a point on the top and/or the top and bottom of the wrapped wire strand thus preventing its movement during wrap of the same layer, or future layers which must rest on it. The exact position of the localized melt of the wire is preferable on the segment OD and segment ID, both locations of which are cut off after weld.

As alternative to the above, high speed non contact precision micro welding which operates "On the Fly" and is capable of securing the brush seal wire using focused optical energy which is supplied by a laser is used. Similar techniques have been developed for rapid hole drilling to perforate sheet metal for aircraft engine combustion liners, and have been demonstrated for use in the automotive sheet metal industry. The laser energy is transmitted using a flexible fiber optical cable connected to an optical scanning head. Mounted inside the scanning head are two computer controlled tilting mirrors that provide high rate pointing of the laser beam (similar to those used in laser writing equipment) to the desired location where a spot weld is needed. The laser beam scan pauses for a fraction of a second—just long enough to melt and fuse together the wire. The integrated high speed scanning/focusing head can be integrated into the wrap machine, such that the weld pulse is synchronized with the part motion and positioning. The laser can provide a weld within a broad area by simply adjusting the computer controlled scanning mirror motion.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a brush seal comprising:
   a) winding a wire about a subassembly including first and second form plates in back-to-back relation to one another to form first and second spaced runs of wire along opposite sides of the subassembly and about first and second opposite edges of the form plates;
   b) securing first and second elongated elements to and on opposite sides of the subassembly adjacent the first form plate edges with the first and second elements overlying portions of the first and second wire runs respectively;
   c) removing portions of the wound wire overlying the first edges of the form plates leaving portions of the wire runs extending respectively between the first and second elements on said opposite sides of the subassembly and wire portions about the second edges of the form plates;
   d) securing the first run portion, the first element and the first form plate to one another;
   e) securing the second run portion, the second element and the second form plate to one another;
   f) removing (i) remaining portions of the wire extending about the second edges of the form plates and (ii) portions of said form plates adjacent the second edges thereof leaving the first and second wire run portions cantilevered from the form plates and elements; and
   g) separating the first and second form plates from one another to form a pair of brush seal segments.

2. A method according to claim 1 including forming each form plate with a through opening between opposite first and second edges thereof.

3. A method according to claim 1 including forming form plates having arcuate first and second edges.

4. A method according to claim 1 including forming wire retention surfaces along at least one of the edges of each form plate including forming one of grooves, serrations or tacky surfaces along said one edge.

5. A method according to claim 1 including forming first aligned openings in said form plates and said elements enabling the form plates and elements to be secured to one another by applying one of bolts, pins or dowels through said aligned openings.

6. A method according to claim 1 including forming a through opening between opposite sides of the first and second edges thereof, leaving opposite frame members of each form plate connected by legs at opposite ends of the form plate, forming said first and second form plates having arcuate first and second frame members, and wherein step (f) includes cutting the legs of said first and second form plates between the first and second edges and at opposite ends of said first and second form plates to cantilever the wire runs.

7. A method according to claim 1 including forming said first and second form plates with said first edges thereof coincident with the arc of a circle, and step (a) includes winding the wire about said first and second form plates at an angle to radii of the first edges.

8. A method according to claim 1 wherein step (a) includes winding the wire about the first and second form plates in passes at different angles relative to one another.

9. A method according to claim 1 wherein each of said first edges of said first and second form plates has a selected radius and step (a) includes winding the wire about said first and second form plates in at least one pass in a direction generally corresponding to a radius at each winding location along said first and second form plates, and winding the wire about said first and second form plates in at least one subsequent pass about said first and second form plates at an angle to the radially wound wire.

10. A method according to claim 1 including forming said first and second form plates having said first edges thereof coincident with the arc of a circle, forming grooves or indentations along said first edges and winding the wire along said first and second form plates and along the grooves or indentations at an angle to radii of the first edges.

11. A method according to claim 1 including forming said first and second form plates having said first edges thereof coincident with the arc of a circle, disposing a sheet of material between said first and second form plates having a first edge corresponding to or projecting beyond said first edges of said first and second form plates and having a generally corresponding arc, said first sheet material edge having grooves or indentations, and winding the wire about said first and second form plates and along the grooves or indentations of the sheet material edge at an angle to radii of said first edges of said first and second form plates.

12. A method according to claim 1 including forming said first and second form plates having said first edges thereof coincident with the arc of a circle, forming grooves along a rod, securing the rod along the first edge of each form plate and generally to a corresponding arc, and winding the wire about said first and second form plates along the grooves of the rod at an angle to radii of a center of the circle.

13. A method according to claim 1 wherein step (a) includes rotating a reel carrying the wire about said first and second form plates to wind the wire about said first and second form plates.

14. A method according to claim 1 including, prior to step (a), (i) winding a guide wire about a sheet of metal stock material and (ii) locating said guide wire wound sheet of metal stock material between said form plates; and step (a) includes winding said wire about the first and second form plates and about said guide wire wound sheet of metal stock material using said guide wire to guide the first wire about the subassembly at an angle relative to said guide wire.

* * * * *